United States Patent [19]

Plummer

[11] Patent Number: 5,370,486

[45] Date of Patent: Dec. 6, 1994

[54] VEHICLE LOCKING FASTENER ASSEMBLY

[76] Inventor: Mark J. Plummer, 680 Amalfi Dr., Pacific Palisades, Calif. 90272

[21] Appl. No.: 810,329

[22] Filed: Dec. 19, 1991

[51] Int. Cl.⁵ ............................................. F16B 37/14
[52] U.S. Cl. .................... 411/430; 411/375; 411/403; 411/910
[58] Field of Search ............... 411/429, 430, 431, 377, 411/910, 371, 373, 375, 376, 403, 405

[56] References Cited

U.S. PATENT DOCUMENTS

| | | | |
|---|---|---|---|
| 1,646,867 | 10/1927 | Nelson | 411/403 X |
| 2,083,092 | 6/1937 | Richer | 411/403 |
| 3,241,408 | 3/1966 | McCauley | 411/910 X |
| 4,015,503 | 4/1977 | Romano | 411/429 |
| 4,206,060 | 6/1980 | Yamamoto et al. | 411/373 X |
| 4,457,654 | 7/1984 | Sygnator | 411/375 X |
| 4,480,513 | 11/1984 | McCauley et al. | 411/403 X |
| 4,669,937 | 6/1987 | Feldman | 411/429 |
| 4,726,723 | 2/1988 | Bainbridge | 411/910 X |
| 4,802,807 | 2/1989 | Offenburger et al. | 411/914 X |
| 5,180,266 | 1/1993 | Nolan et al. | 411/429 |

FOREIGN PATENT DOCUMENTS 737336  7/1943  Germany ............... 411/429

*Primary Examiner*—Rodney M. Lindsey
*Attorney, Agent, or Firm*—Robert J. Schaap

[57] ABSTRACT

A vehicle locking fastener assembly primarily adapted for locking a vehicle wheel to a hub of a vehicle. The locking fastener assembly may adapt the form of a lock bolt assembly or a lock nut assembly. This assembly is comprised of a cylindrically shaped lock nut body having an end wall which may be in the nature of an end cap and which is provided with an enlarged central opening. The opening of the end cap is formed by a somewhat serpentine edge. A jacket is provided for covering the vehicle lock nut and which also has a cylindrically shaped body extending around and engaging the outer side wall of the lock nut body. The jacket similarly has a transverse end plate formed with a somewhat undulating recess. In this case, the recess is formed by a pair of spaced apart recess-forming walls and with the outer wall generally conforming to and engaging the undulating edge of the lock nut. In this way, the exact size and shape of the recess in the lock nut assembly may be defined by the inner recess-forming wall of the jacket. In another embodiment of the invention, the locking fastener assembly may adopt the form of a lock bolt which has a bolt shank and a locking head.

29 Claims, 10 Drawing Sheets

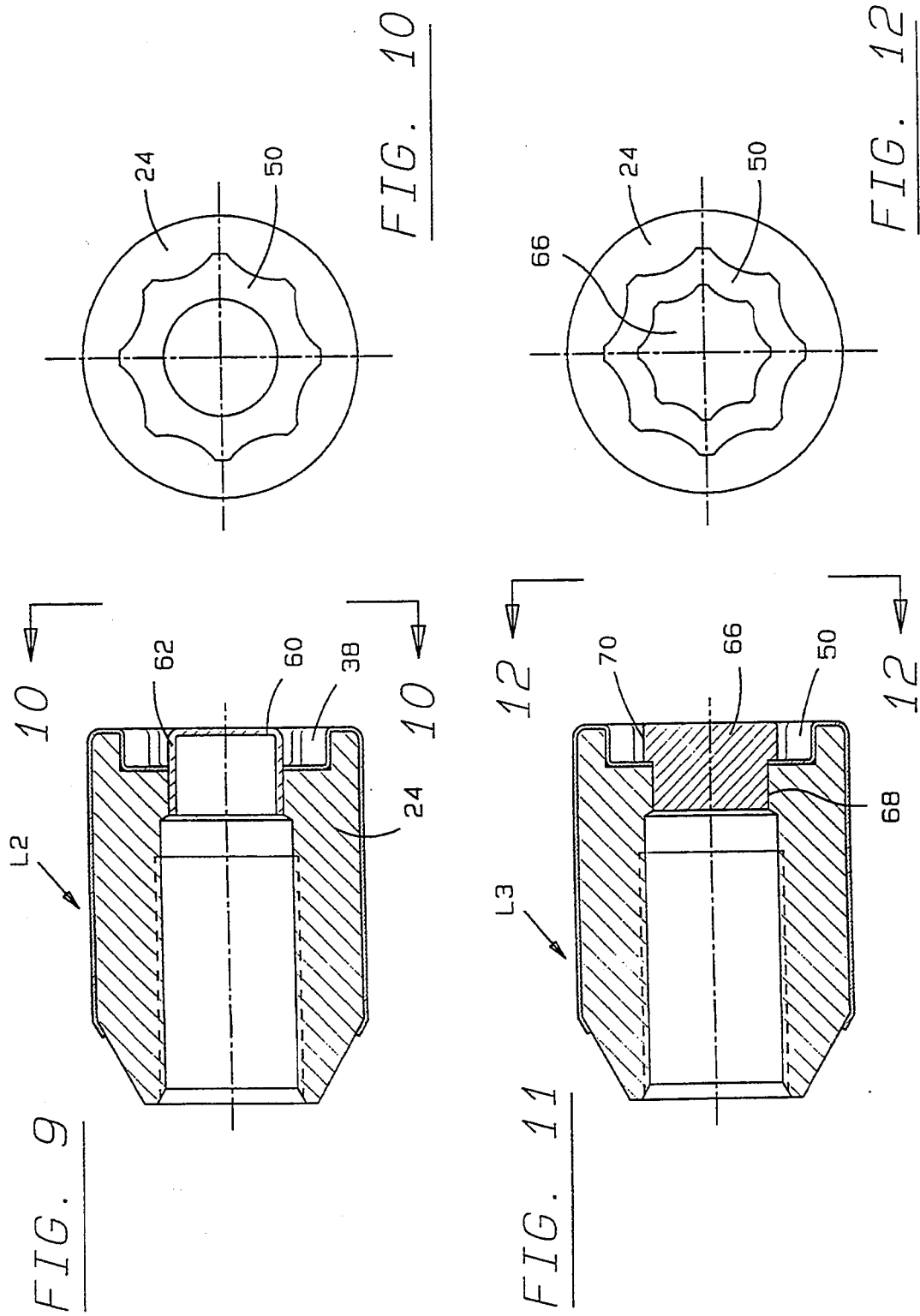

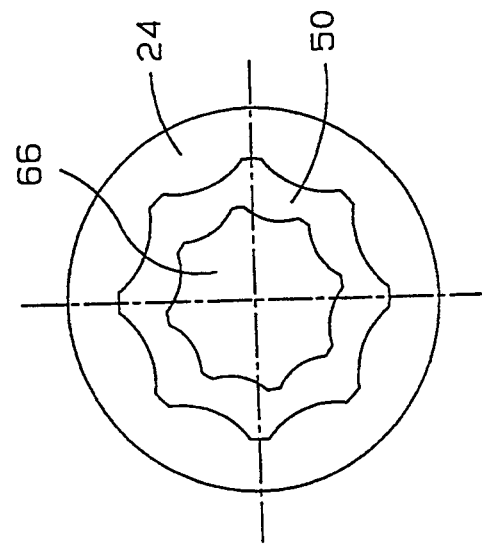
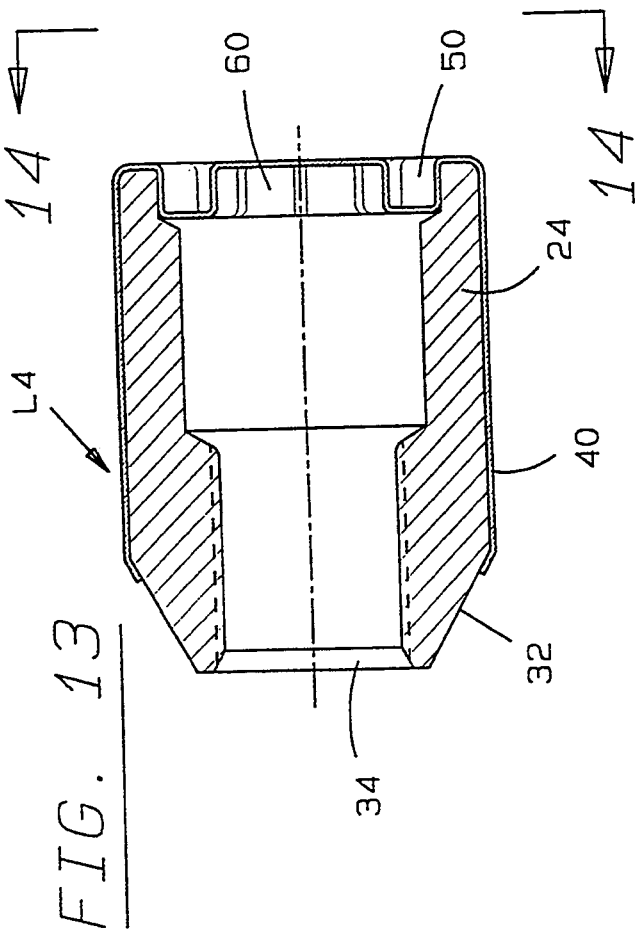

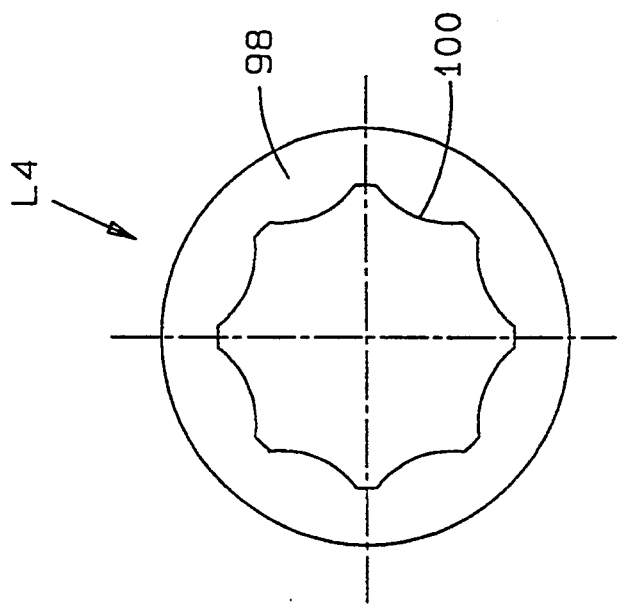
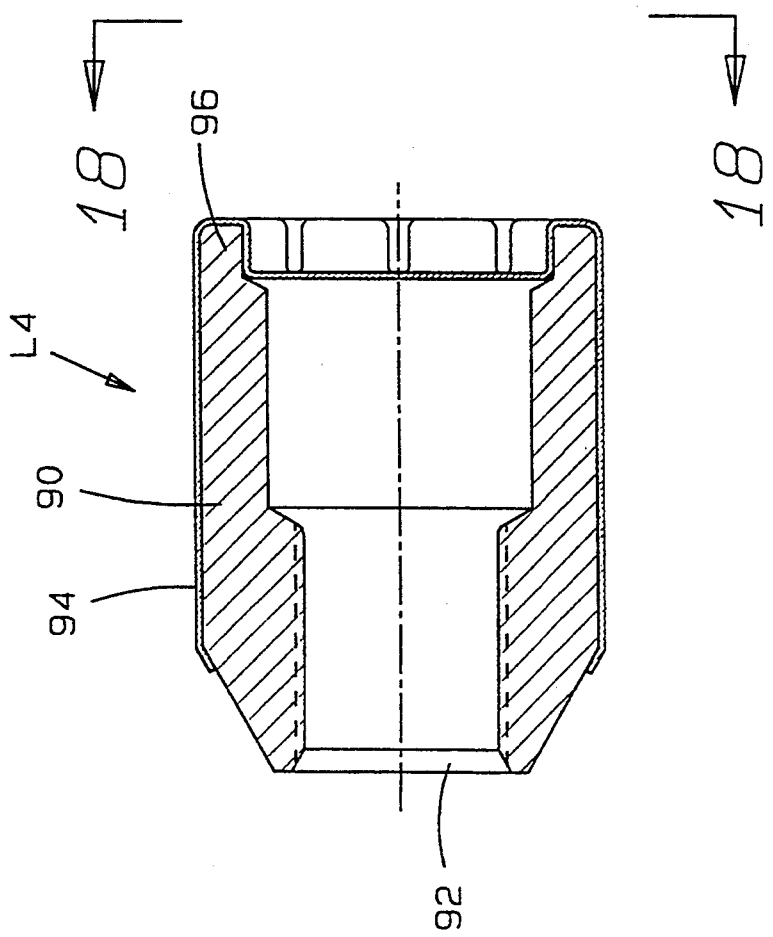
FIG. 17
FIG. 18

VEHICLE LOCKING FASTENER ASSEMBLY

BACKGROUND OF THE INVENTION

1. Field of the Invention

This invention relates in general to certain new and useful improvements in vehicle locking fastener assemblies, and more particularly, to an improved vehicle locking fastener assembly having a body and decorative outer jacket secured to the body and extending therearound.

2. Brief Description of the Prior Art

For some period of time, automobile manufacturers were using chrome plated vehicle lug nuts for securing a vehicle wheel to a hub of the vehicle. For security purposes, many manufacturers are offering vehicle lock nuts. These lock nuts differ primarily from the lug nuts in that they do not have a side wall which can be gripped by a torque imparting tool, as do the lug nuts. Rather, the lock nuts have a top wall or a cap with a recess or groove, usually a somewhat undulating or serpentine groove, to receive a torque imparting tool.

In order to improve aesthetic appearance, manufacturers produced chrome plated lug nuts. The chrome plated lug nuts were initially popular but it was found that after being engaged by a tool, the chrome would be damaged resulting in the bare metal. The bare spots would soon rust and become unsightly. Thus, the chrome plated lug nuts which were designed to improve the aesthetic appearance of the vehicle would actually result in a degradation of the aesthetic appearance.

In order to overcome this problem and to still provide a lug nut which was more aesthetically attractive than a conventional steel lug nut, several automotive parts manufacturers have resorted to stainless steel capped lug nuts. However, the stainless steel lug nuts are more costly, both in the cost of the material and in the manufacturing processes involved to form the nuts. In recent years in the automotive industry, it has become quite fashionable to use non-steel wheels as, for example, the light-weight aluminum wheels and even magnesium wheels. Even more so, there has been an introduction of chrome-plated wheels for many vehicles, particularly in the automotive after market. It would be desirable to use either chrome-plated lug nuts or even lock nuts in connection with these wheels or, for that matter, to use chrome-plated jackets on the lug nuts or lock nuts for securing these relatively soft-metal wheels to the hub of a vehicle.

Lock nuts are highly desirable for use in securing the most expensive wheels such as the soft metal wheels including aluminum wheels, due to the high cost thereof in order to prevent theft. They are also desirable for securing steel wheels, particularly for use on vehicles parked in high-theft rate areas. The lock nuts provide a higher degree of security as indicated above, in that a special tool is required to remove the lock nut, whereas a conventional lug nut can be removed by commercially available, easily obtainable wrenches.

One of the principal problems encountered in using chrome-plated lock nuts for securing a soft metal vehicle wheel to the hub of the vehicle was the fact that the chrome would actually gall the seat of the wheel which receives the nut. This is particularly a pronounced problem when the wheel itself is also chrome-plated. This galling effect results in a marring of the surface of the wheel. As a result, there has been a need for vehicle lock nuts which are capable of locking a vehicle wheel, and particularly a soft metal vehicle wheel, on the hub of the vehicle and which are still capable of providing a decorative appearance without marring the surface of the wheel or the lock nut.

One of the principle problems in the production of lock nuts is the fact that the undulating recess of one group of lock nuts must be different from the undulating recess of another group of lock nuts. Thus, each group or series of lock nuts is provided with a type of security code defined by that particular undulating or serpentine recess. From the standpoint of the manufacturer, each series or group of lock nuts thereby required a modified tooling or die combination for forming the undulating recess.

A differently coded torque imparting tool is required for each group of lock nuts so that all lock nut purchasers and the public in general would not have direct access to remove the lock nuts and hence the ability to remove the lock nuts from vehicles of other parties. This results in a substantially increased cost of manufacture and hence cost of purchase of lock nuts. Thus, manufactures are presently forced to engage in the higher cost of manufacture by virtue of changing the patterns for different group or sets of lock nuts and to pass this increase in price onto the purchaser. This problem would be particularly pronounced if the lock nuts were chrome plated or made with stainless steel.

U.S. Pat. No. 3,364,806 to Chaivre discloses a capped hexagonally shaped wheel lug nut. In this case, the wheel lug nut is provided in the form of a lug nut having flats for a tool such as a wrench. The nut also has a cap fitted over the upper surface thereof although the cap does extend over a portion of the side wall on the flat to the nut. U.S. Pat. Nos. 1,829,972 dated Nov. 3, 1931 to Wiley and 1,580,186 dated Apr. 13, 1926 to Wiley both disclose capped nuts. In this case, the nuts are lug nuts or otherwise nuts for general purpose use but which are provided with flat tool-engaging side wall surfaces. The same holds true with regard to the cap nut disclosed in U.S. Pat. No. 787,578, dated Apr. 18, 1905 to Lambert.

Additional capped nuts and variations thereof are shown in U.S. Pat. Nos. 3,955,234 dated May 11, 1976 to Erdmann, 1,830,787, dated Nov. 10, 1931 to Ferry, 3,971,289, dated Jul. 27, 1976 to Chaivre, and 1,632,991 dated Jun. 21, 1927 to Booth. Additional variations of nuts are shown in U.S. Pat. Nos. 227,596, dated May 15, 1983 to Moore and 1,381,437, dated Jun. 14, 1921 to Smith. In each of the prior art patents the nuts are all in the nature of lug nuts, in that they have flats, e.g. regularly arranged flat tool engaging surfaces on the side walls thereat.

There is presently no available or proposed lock nut device which is provided with a jacket extending around a portion of the side wall and the upper surface thereof. Moreover, there is no lock nut having a jacket which does not tend to be forced off of the nut when a tool engages the cap or the nut itself. Further, there is no commercially available lock nut which has a highly decorative appearance and which can be used for securing a soft metal wheel to the hub of a vehicle without damaging or marring either the wheel or the lock nut. There is also no commercially available lock bolt which is capable of securing a wheel to a vehicle hub and which utilizes a jacket in the manner as described in connection with lock nuts.

OBJECTS OF THE INVENTION

It is, therefore, one of the primary objects of the present invention to provide a vehicle fastener assembly for securing a vehicle wheel to a vehicle hub and which may adopt the form of an improved vehicle lock nut assembly or an improved vehicle bolt assembly.

It is another object of the present invention to provide a fastener assembly in the form of a vehicle lock nut assembly which is provided with a somewhat cylindrically shaped body and an end wall having a somewhat undulating opening formed therein and where the jacket is similarly formed with an end having an undulating shaped recess cooperating with the opening on the end wall of the lock nut.

It is a further object of the present invention to provide a unique jacket which is capable of being fitted over and secured to a vehicle lock nut for altering the outer aesthetic appearance of the lock nut.

It is also an object of the present invention to provide a vehicle lock nut assembly of the type stated in which the size and shape of the undulating recess in the end wall is partially defined by the jacket which is employed.

It is an additional object of the present invention to provide a vehicle lock nut assembly with a unique outer jacket which can be pressed onto or fitted over the lock nut body and which will be retentively held thereon even when a torquing tool is applied thereto.

It is another salient object of the present invention to provide a system of producing lock nuts in which the undulating recesses of different sets of lock nuts can be easily altered by changing the recesses in the jackets and which thereby avoids the necessity of changing the dies or molds for producing the lock nuts.

It is yet another object of the present invention to provide a vehicle lock bolt assembly which is provided with a jacket extending over a portion thereof and which jacket cooperates with the bolt to define an undulating torque receiving groove to receive a torquing tool.

It is an additional object of the present invention to provide a vehicle fastener assembly of the type stated which is highly effective for its intended purpose and which can be produced at a relatively low cost.

With the above and other objects in view, my invention resides in the novel features of form, construction, arrangement and combination of parts presently described and pointed out in the claims.

BRIEF SUMMARY OF THE INVENTION

The present invention relates to a unique vehicle locking fastener assembly which is primarily adapted for the securement of a vehicle wheel to a wheel hub of that vehicle. The locking fastener assembly may adopt the form of an improved lock nut assembly or otherwise an improved lock bolt assembly. However, in either case the locking fastener assembly is not exclusively limited to use with vehicle wheels and could find employment in areas where lock nuts and lock bolts are otherwise employed.

Several of the unique embodiments of the present invention rely upon a vehicle lock nut assembly. Normally, a lock nut would be adapted as a replacement for a conventional lug nut when used for securing a wheel to a vehicle hub. The improved vehicle lock nut assembly of the present invention is provided with a jacket as hereinafter described, so as to present a highly aesthetic outer appearance. The vehicle lock nut assembly is adapted for threaded securement to an outwardly projecting threaded stud on the vehicle hub.

As indicated previously, a chrome-plated lock nut would gall against the seat of a wheel such as an aluminum wheel and this is, of course, highly undesirable. In order to eliminate this problem, in accordance with the present invention, it has been found that by utilizing a zinc plating on the nose of a lock nut, that the zinc actually provides a lubricating effect and overcomes the problem of galling which previously resulted in prior art lock nut devices. However, the zinc finish does not have nearly the aesthetic value as does a chrome finish or even a stainless steel finish. Therefore, in order to avoid this problem, in accordance with the invention, a jacket of a finish other than plain steel or zinc is fitted over the lock nut. This jacket may be either a stainless steel jacket or it may be chrome plated or provided with another desirable finish.

The present invention provides a unique lock nut assembly which comprises a lock nut having a cylindrically-shaped side wall and an end wall extending thereacross. The lock nut assembly is also provided with a jacket which extends about a portion of the lock nut and particularly the side wall thereof.

The practical considerations in the design and manufacture of a lock nut are very different than those involved in a lug nut, particularly where a jacket or cap is located over a portion of that nut. The forces imposed on a lug nut, or other form of nut in the nature of a lug nut, having tool-engaging surfaces or so-called flats are also considerably different than the forces imposed on a lock nut. In the case of a lug nut or other nut having tool-engaging flats, torque is applied to the nut through the flats by engaging the side wall thereof. In the case of a lock nut, torque is applied to the upper surface when a tool is forced axially onto the lock nut.

The conventional lock nut is usually provided with an outer body, such as a cylindrically shaped body, so that a torque imparting tool cannot engage the side wall of the lock nut. The lock nut is provided with an end which is, in turn, provided with a recess, usually a somewhat undulating or serpentine recess. In this way, a specially designed tool is provided for engagement with the recess to provide torque to the lock thereby enabling rotation the lock nut.

The present invention provides a unique jacket for use with this lock nut. The jacket has a side wall generally conforming to the side wall of the lock nut and snugly engaging the side wall of the lock nut. The jacket itself may be formed of a more aesthetically pleasing material such as stainless steel or otherwise, it can be chrome plated or otherwise plated with other materials. As indicated previously, the nose portion of a vehicle lock nut can be zinc plated and preferably, the entire lock nut forming part of an assembly may be zinc-plated. In this way, the zinc coating on the nut operates as a lubricating surface so that the lock nut, when tightened against the wheel, does not mar or gall the surface of the wheel. However, the chrome-plated or stainless steel jacket or other jacket covers the zinc plating and provides a much more aesthetic appearance than does a plain steel lock nut or even a stainless lock nut.

In the lock nut assembly of the invention, the lock nut itself does not necessarily require a full undulating or serpentine recess. Rather, the lock nut and jacket cooperate to define the particular undulating or serpentine recess. In this case, the lock nut is provided with a body having the aforesaid side wall and an interiorly threaded internal bore to receive the stud from a vehicle wheel hub.

The lock nut of the invention is also provided with a generally flat end wall having an opening therein. The opening in the end wall of the lock nut is formed by a somewhat undulating or serpentine wall which will, in effect, define the outer wall of a tool receiving groove or recess. The jacket similarly has an end plate which is adapted to engage the end wall of the lock nut. This end plate of the jacket is provided with a tool engaging somewhat undulating groove used in the lock nut assembly. Thus, the groove in the jacket will have an outer wall conforming to and snugly engaging the wall forming the opening in the lock nut. The groove is also formed by an inner wall spaced from the outer wall thereof. In this way, the jacket partially defines the size and shape of the tool receiving groove.

One of the unique aspects of the improved lock nut assembly of the present invention is the fact that the jacket does not necessarily have to be welded to the lock nut. In the case of the lug nut, when a torque imparting tool was applied to the lug nut, there was a tendency for the jacket to separate from the lug nut. However, in this case, it has been found that since the torque is applied to the head end of the jacket, there is no tendency for the jacket to separate from the lock nut. Further, the jacket is held onto the lock nut by providing some type of securement mechanism which may preferably adopt the form of a swaged end.

The present invention also provides an improved vehicle lock bolt assembly. The lock bolt assembly is similar in many respects to the vehicle lock nut assembly, except for the fact that it is a bolt adapted for securement to an internally threaded recess or nut. The lock bolt assembly includes a torque receiving tool head with a threaded shank thereon. The tool receiving head is similar to that employed on the lock nut. Thus, an in this respect, the lock bolt is similar to the lock nut except that the lock bolt has an externally threaded shank and the lock nut has an internally threaded recess.

The present invention provides still a further embodiment of a locking fastener in which there is only a single undulating outer wall forming the groove or recess to receive a torque imparting tool. In other words, the recess or groove does not have an inner undulating wall. Nevertheless, this fastener, which also may adopt the form of a lock bolt includes the nut itself as well as the outer jacket.

This invention possess many other advantages and has other purposes which may be made more clearly apparent from a consideration of the forms in which it may be embodied. These forms are shown in the drawings forming a part of and accompanying the present specification. They will now be described in detail for purposes of illustrating the general principles of the invention, but it is to be understood that the following detailed description is not to be taken in a limiting sense.

BRIEF DESCRIPTION OF THE DRAWINGS

Figure 1:
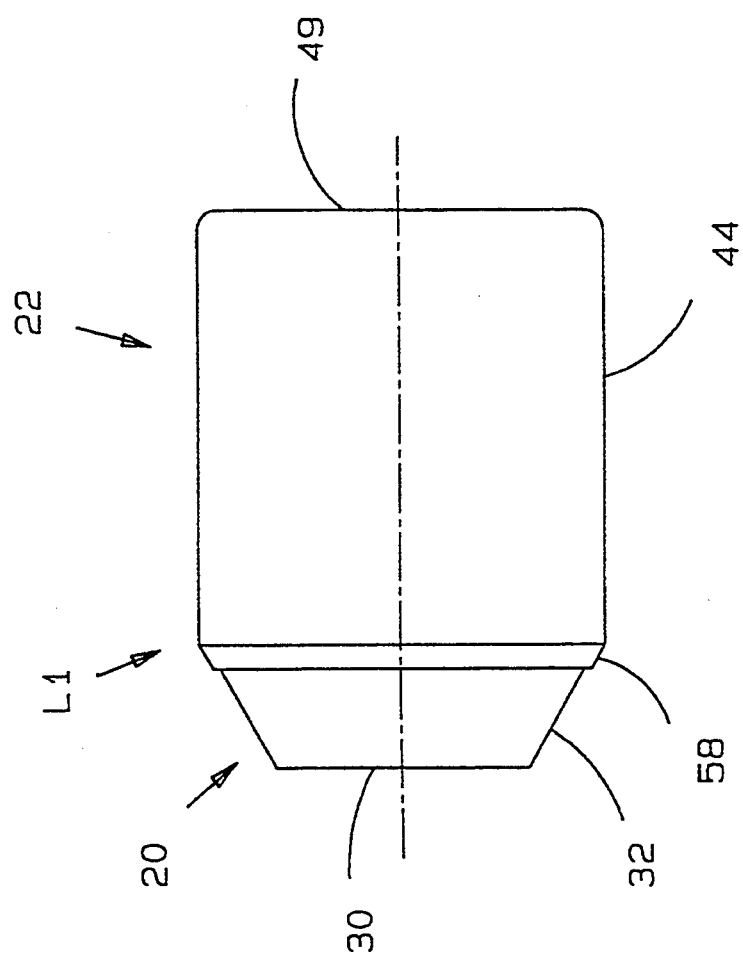
Figure 2:
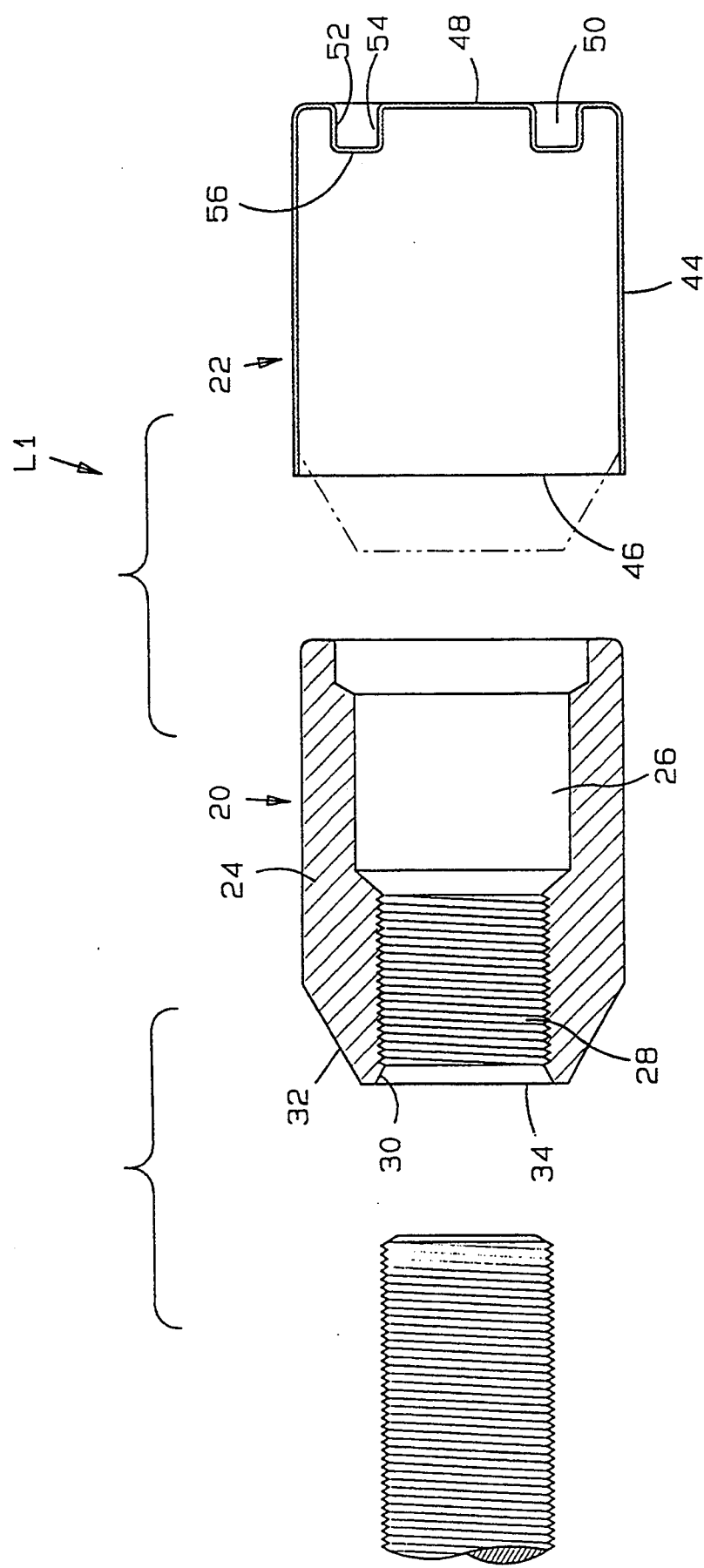
Figure 4:
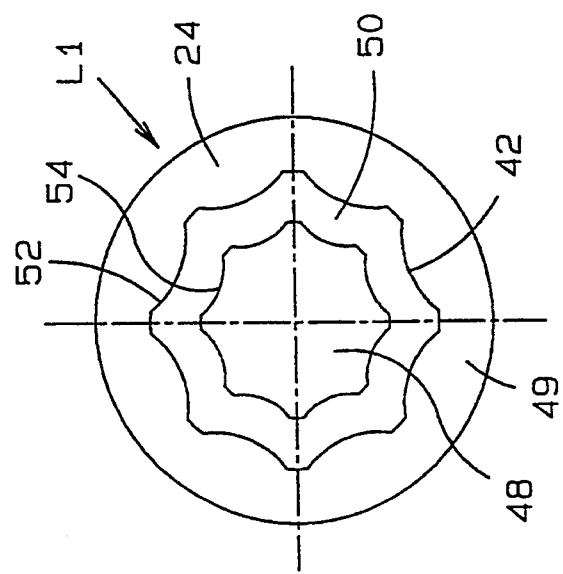
Figure 3:
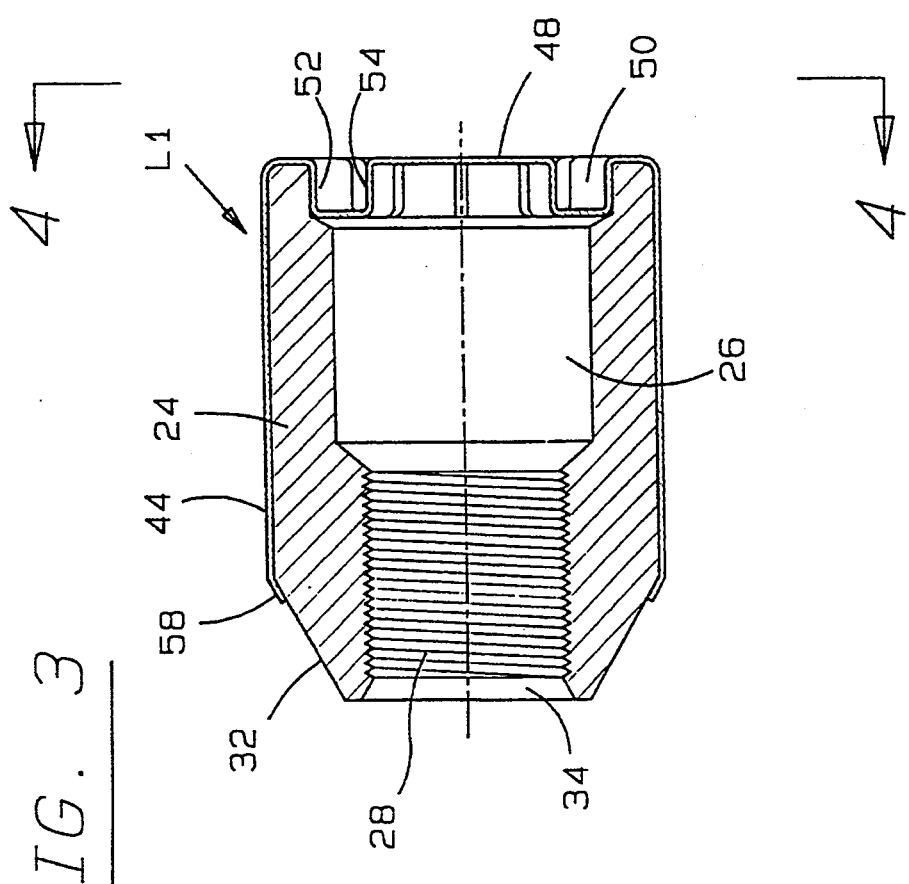
Figure 6:
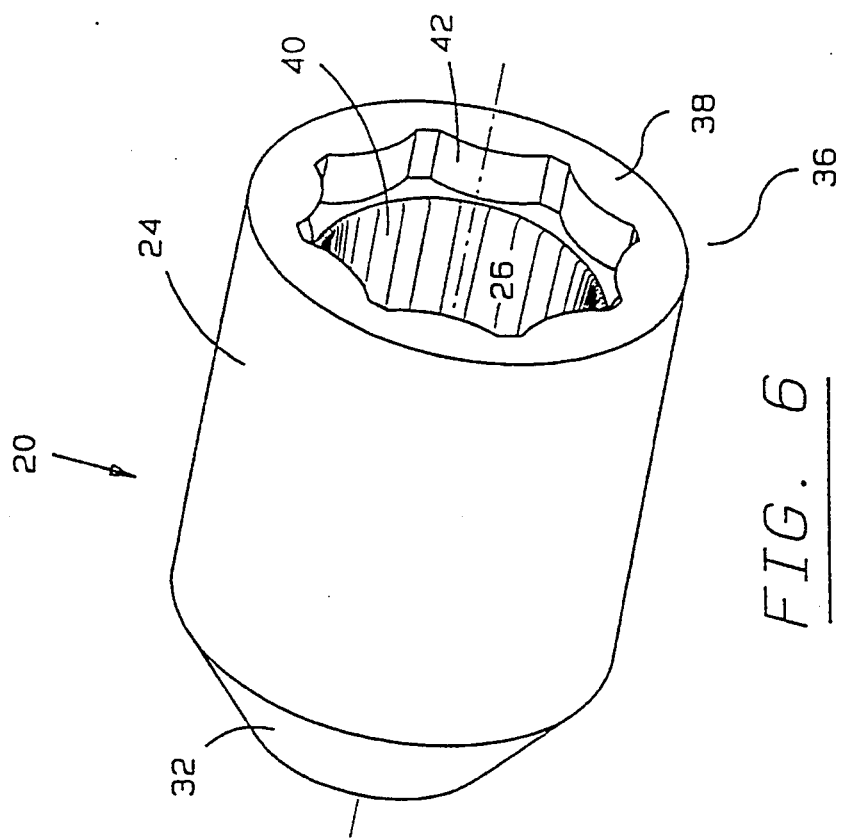
Figure 5:
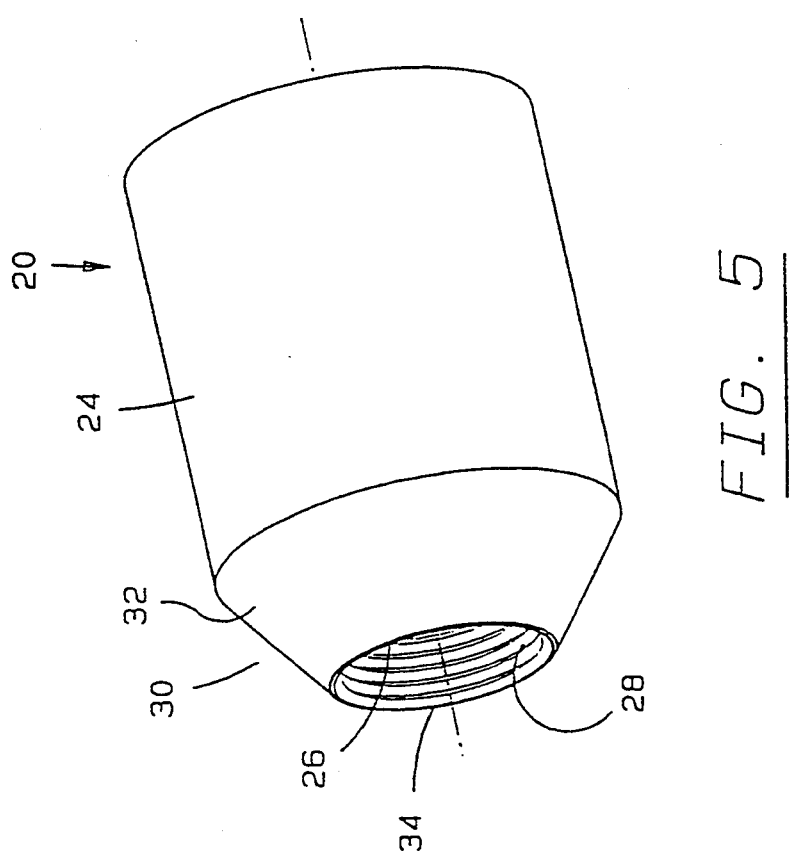
Figure 7:
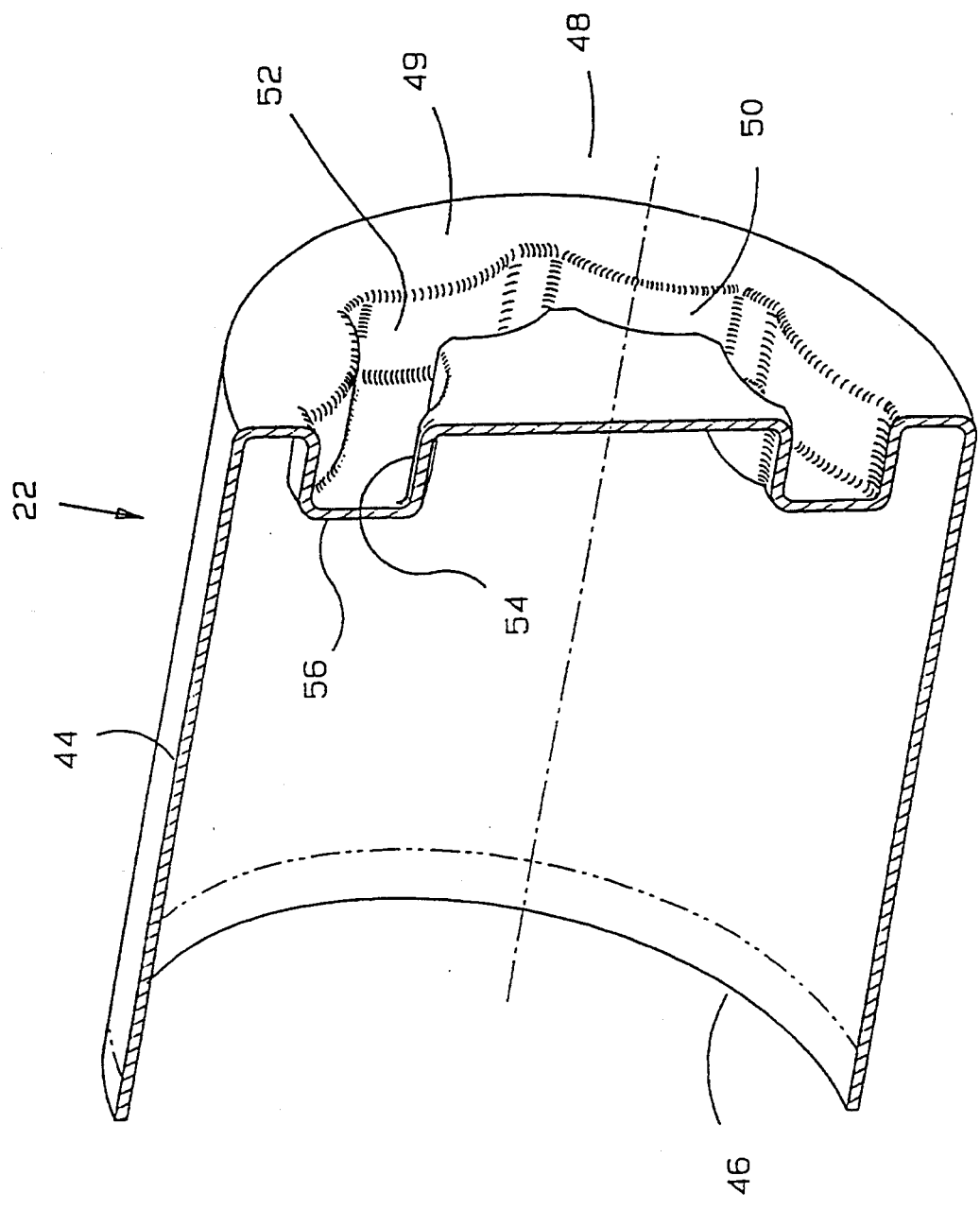
Figure 8:
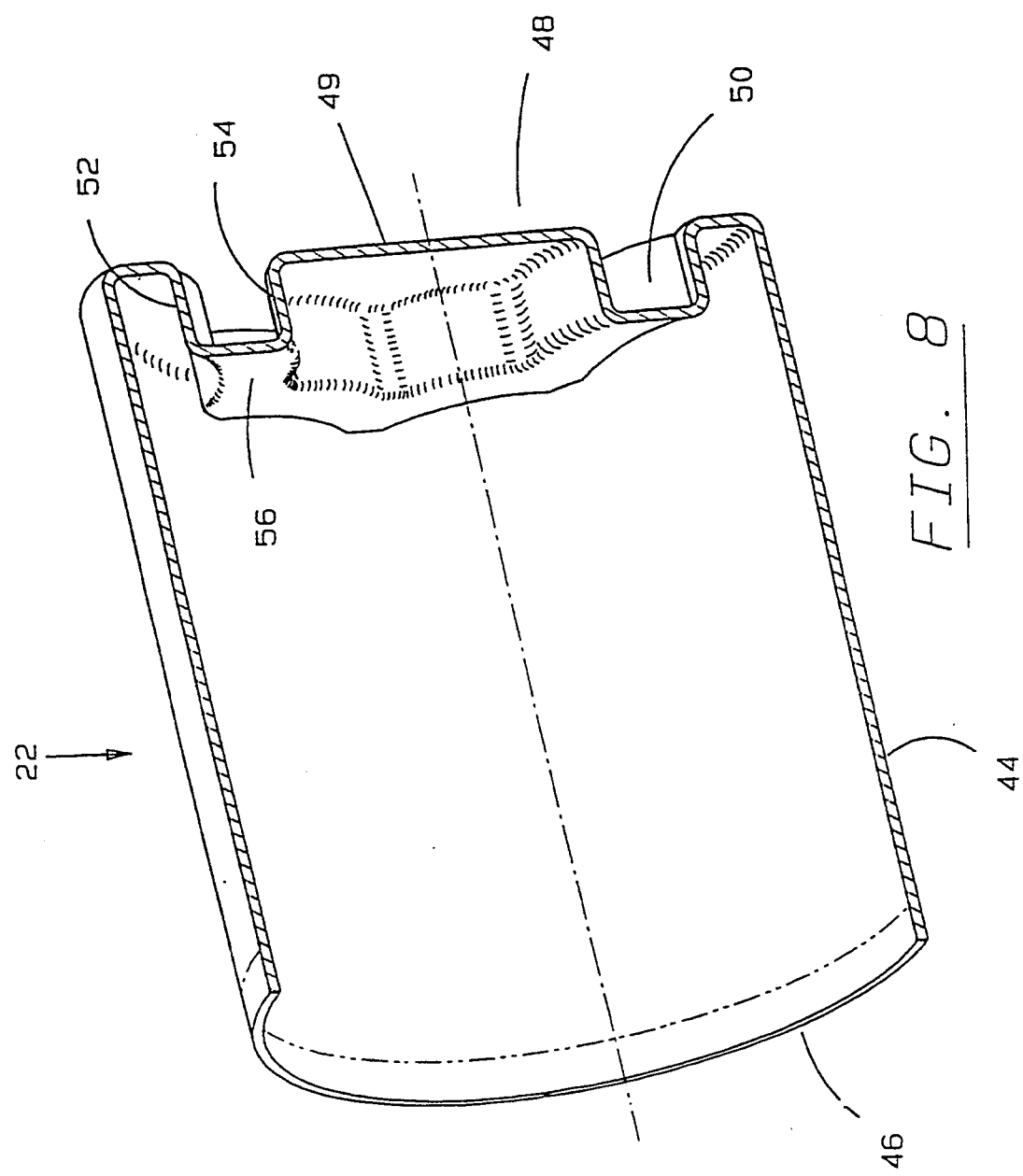
Figure 15:
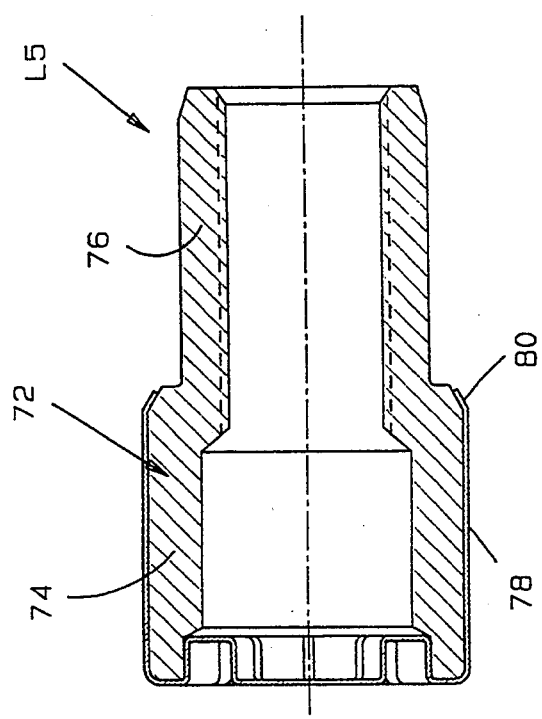
Figure 16:
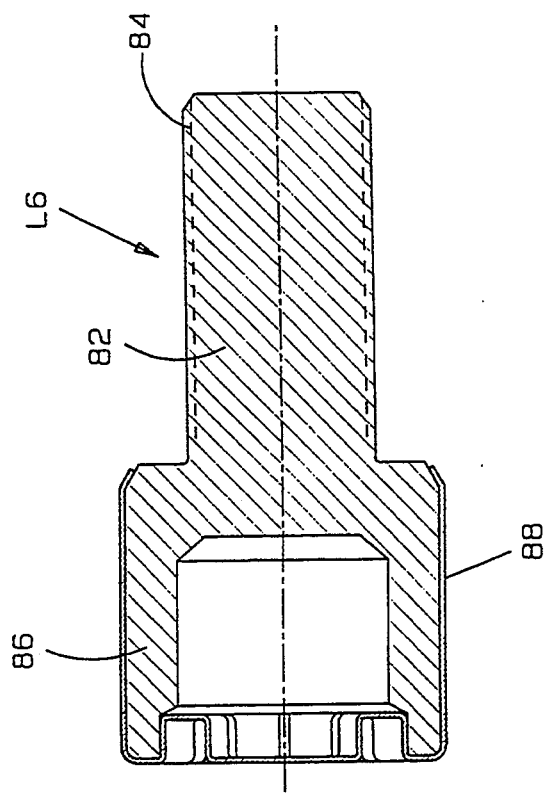

Having thus described the invention in general terms, reference will now be made to the accompanying drawings (eight sheets) in which:

FIG. 1 is a side elevational view of vehicle lock nut assembly constructed in accordance with and embodying the present invention;

FIG. 2 is an exploded vertical sectional view showing the relationship of a jacket to a lock nut and to a vehicle stud forming part of the lock nut assembly of the present invention;

FIG. 3 is a vertical sectional view showing a jacket on the lock nut forming the lock nut assembly of the present invention;

FIG. 4 is an end elevational view taken substantially along the plane of line 4—4 of FIG. 3;

FIG. 5 is a perspective view showing one end of a lock nut used in the lock nut assembly of the present invention;

FIG. 6 is a perspective view particularly showing another end of the lock nut used in the lock nut assembly of the present invention;

FIG. 7 is a fragmentary perspective view, partially broken away and in section, of a jacket forming part of the lock nut assembly of the present invention;

FIG. 8 is another perspective view, partially broken away and in section, and showing the jacket used in the lock nut assembly of the present invention;

FIG. 9 is a vertical sectional view of an alternate embodiment of a vehicle lock nut assembly constructed in accordance with and embodying the present invention;

FIG. 10 is a top plan view of the vehicle lock nut assembly of FIG. 9 taken substantially along the plane of line 10—10 of FIG. 9;

FIG. 11 is a vertical sectional view of another modified embodiment of a vehicle lock nut assembly constructed in accordance with and embodying the present invention;

FIG. 12 is a top plan view of the vehicle lock nut assembly of FIG. 11, taken substantially along the plane of line 12—12 of FIG. 11;

FIG. 13 is a vertical sectional view of still another modified embodiment of a vehicle lock nut assembly constructed in accordance with and embodying the present invention;

FIG. 14 is a top plan view of the vehicle lock nut assembly of FIG. 13 taken substantially along the plane of line 14—14 of FIG. 13;

FIG. 15 is a vertical sectional view showing still another modified form of vehicle lock nut assembly constructed in accordance with and embodying of the present invention;

FIG. 16 is a vertical sectional view showing a vehicle lock bolt constructed in accordance with and embodying the present invention;

FIG. 17 is a vertical sectional view showing still another modified form of vehicle lock nut assembly constructed in accordance with and embodying the present invention; and FIG. 18 is a top plan view of the vehicle lock nut assembly of FIG. 17 taken substantially along the plane of lines 18—18 of FIG. 17.

DETAILED DESCRIPTION OF PREFERRED EMBODIMENTS

Referring now in more detail and by reference characters to the drawings which illustrates several practical embodiments of the present invention, $L_1$ designate a lock nut assembly which is used for securing a vehicle wheel to the wheel bolts (often referred to as studs) extending outwardly from a wheel hub. In this sense, the wheel lock nut assembly may be used as a substitute for the so-called conventional lug nuts, the latter having a plurality of flat side walls which serve as tool engaging surfaces.

The lock nut which is used in the lock nut assembly of the invention differs from a conventional lug nut in that the lock nut is provided with a torque providing tool receiving recess on the end wall thereof, that is the flat end wall which faces away from the wheel hub when the nut is secured to a stud extending outwardly from the wheel hub. This tool engaging recess or groove is somewhat of an undulating or serpentine recess, as hereinafter described, so as to receive a corresponding end of a particular tool which is not readily available to the public in general. Thus, the lock nut serves as a type of security nut which precludes unauthorized removal of the lock nut and hence the wheel of the vehicle.

By slightly changing the size or shape of the recess, a different torque imparting tool would be required to apply a torque to the lock nut for purposes of threadedly mounting the same onto or removing the lock nut from a vehicle wheel stud. Thus, the particular recess or tool receiving groove represents a type of security code for the lock nuts.

Due to the fact that different tooling of dies are required for each different shape of tool receiving recess or groove in the prior art and presently, a large group or set of lock nuts is formed with the same tool receiving groove. Thereafter, a second large group of lock nuts is formed with a modified tool receiving groove. It is theorized that if the lock nuts are widely marketed across wide geographic areas on a statistical basis, the purchaser of one lock nut and the corresponding torque imparting tool would not have access to similar lock nuts. Nevertheless, the theory does not always prove to be correct.

As an optimum system, it would be desirable to have different patterns for each set of lock nuts. Heretofore, this was not accomplished in an economically feasible way since new dies or tooling were required for each different pattern and hence security code in a lock nut. The present invention overcomes this problem in the very construction of the lock nut such that small groups or sets of lock nuts can be produced with a particular code for a vehicle and where the code can be changed for sets of lock nuts used with other vehicles on a relatively economical basis.

In one embodiment, the fastener assembly is a lock nut assembly $L_1$ which generally comprises a lock nut 20, and an outer jacket 22. The lock nut 20, as best shown in FIGS. 2 and 4–6, comprises an outer body 24 having a central bore 26 which is provided with an internally threaded section 28, the latter being adapted for threaded securement to an externally threaded section on a wheel mounting stud S projecting outwardly from a wheel hub (not shown). The construction of a wheel mounting hub and the outwardly projecting stud is neither illustrated nor described in any further detail herein inasmuch as this construction is well known.

The lock nut 20 is provided with a tapered tail end 30 comprised of an annular inwardly tapered section 32 and an opening 34 leading to the control bore 26 for receiving an externally threaded stud S projecting from a wheel hub. The lock nut 20 is also provided with a so-called "head end" 36 having a relatively flat circularly shaped end wall 38. The end wall 38 is provided with an enlarged central opening 40 communicating with the interior bore 26. This opening 40 is formed by a continuous somewhat serpentine and undulating wall 42.

Inasmuch as the side wall 24 is cylindrically shaped, it does not provide so-called flats, that is flat walls, for engageable tools such as wrenches, pliers or the like. As a result, the lock nut serves as a security device in that it can only receive a tool having a projecting shank end which conforms to the size and shape of the recess in the finished lock nut assembly.

The outer jacket 22 is in the nature of a sleeve and is similarly provided with a cylindrically shaped side wall 44 which is sized to receive and snugly engage the exterior cylindrical surface of the body 24, in the manner as best illustrated in FIG. 3 of the drawings. This sleeve 44 is provided with a left-hand end 46, reference being made to FIG. 2, or a so-called "tail end" which is opened in order to receive the lock nut 20.

At its opposite end, the sleeve 44 is provided with a closed head end 48 having a flat wall 49 adapted to engage against the flat wall 38 at the head end of the nut 22. This flat wall 49 is similarly provided with a groove 50 sized to fit within the opening 40 in a manner as hereinafter described in more detail.

By reference to FIGS. 4, 7 and 8 of the drawings, it can be observed that the groove 50 is somewhat U-shaped in cross-section and formed by an outer groove-forming surface 52 and an inner groove-forming surface 54 connected by a bottom wall 56. Moreover, the groove forming surfaces 52 and 54 are also serpentine and undulating in the same manner as the wall 42 forming the opening 26 in the lock nut 22. Further, the outer groove-forming surface 52 will have precisely the same size and shape as the wall 42 forming the opening 26 so as to fit within the opening and snugly engage the wall 42. The groove-forming surface 54 may have the same shape as the outer groove forming surface 52, but would be of reduced diameter.

It can be observed that the wall 42 defining the edge of the opening 26 in the lock nut, along with the outer groove-forming surface 52 define one side of the groove and the other side of the groove in the lock nut assembly is defined by the particular size and shape of the inner groove-forming wall 54. In accordance with this construction, it is possible to slightly alter the size and shape of the groove-forming wall 54 in order to provide a torque tool receiving groove 50. Thus, by using the lock nut assembly of the present invention, it is not nearly as expensive as retooling to obtain different combinations in a conventional lock nut. In essence, the same lock nut, as illustrated in FIGS. 5 and 6, can be used with different jackets in order to provide different tool receiving grooves. The inner groove-forming surface in one lock nut may be rotated slightly with respect to the outer groove-forming surface to provide a tool receiving groove which is different from those with other lock nuts in order to provide a different "coding."

By providing a slightly different undulating wall 42 or a slightly different undulating surface 52 or orienting them differently with respect to one another, different lock combinations are formed. In this way, one must have a tool with a shank end conforming to the particular recess or groove 50. In the embodiment as illustrated in FIG. 4, the groove 50 is not only undulating, but somewhat sinuous in nature and is also preferably but not necessarily regular. However, it is not necessary to have a regular or for that matter a sinuous groove.

The tail end 46 may also be bent with an inwardly struck flange 58 so as to snugly engage the tapered section 32 on the tail end 30 of the lock nut 20. Thus, the outer cylindrical wall of the sleeve 44 could be tapered inwardly, as shown in FIG. 2, so as to snugly engage the tapered end 32 of the lock nut 20. In this way, the outer jacket 22 would be retentively held on the lock nut 20.

In addition, the tail end 46 can be welded or otherwise rigidly secured to the lock nut by some means of permanent attachment. This weld may take the place of, or may be in addition to, the swedging of the end of the jacket. Finally, the jacket could actually be welded to the lock nut itself at any one or more places along its length or on the surface 49.

As indicated previously, jackets have been proposed for use on lug nuts, as illustrated in some of the prior art described above. It was recognized that a wrench or like tool could provide a torque to a lug nut through the side walls or flats of that lug nut. However, due to the fact that the torque to a lock nut was applied axially, in some cases, there was a tendency for the jacket to rotate with respect to the lock nut itself if the tolerance between the jacket and the nut was too great. In some cases, the jacket would stretch and would not provide an adequate tight fitting disposition about the lock nut. As a result, heretofore, there has not been any effective use of a jacket on a lock nut for securing a vehicle wheel to a wheel hub.

One of the principal unique aspects of this invention is that it is now possible to use a zinc-plated lock nut or at least a lock nut having a zinc-plated nose portion with an outer jacket such as a chrome-plated jacket or a stainless steel jacket on a conventional and less expensive lock nut. Thus, the lock nut could be made of from relatively inexpensive steel material and provided with an outer aesthetically pleasing jacket. Since a chrome-plated jacket can be used on each nut in accordance with this invention, not only does the invention reduce manufacturing costs, but it also substantially reduces material costs. Moreover, the labor involved in the assembly of the outer jacket on the lock nut is nominal so that the entire lock nut assembly can be produced at a low cost.

It can be observed the use of the jacket on the lock nut not only enables the use of an assembly which is less costly to manufacture and sell, but it also permits the outer jacket to be retentively held on the lock nut. In the case of a lug nut, when a tool was applied to the side walls of a jacket surrounding the lug nut, there was a tendency for the jacket to separate. Indeed, and in many cases, it was necessary to literally weld the jacket onto the hexagonally shaped lug nut in order to preclude separation of the jacket from the lug nut.

When a torque imparting tool such as a wrench is turned on a conventional lug nut having an outer jacket, the material forming the jacket is actually thinned and expands and results in a reduced cross-sectional thickness. Further, when a wrench is applied to the jacket, there is a resultant smashing of the hexagonally shaped nut. The result is similar to that of hitting the nut with a hammer. There is actually a growing and expanding effect which results. Consequently, there is a resultant loosening of the jacket on the lug nut.

It can be observed than when a torque imparting tool, such as a wrench, is applied to a conventional lug nut having an outer jacket, the tool itself is tightened about the outer jacket.

In the case of the groove formed in the lock nut of the present invention, the outer groove-forming surface 52 in the jacket bears snugly against the wall 42 forming the opening 26 in the lock nut. When a torque imparting tool is applied to the groove 50, this tool will literally force the surface 52 into very intimate contact with the wall 42 of the lug nut thereby reducing any tendency of separation. As a result, there will be little or no slippage. In addition, when a torque imparting tool is applied to the lock nut assembly, the force from the tool is directed axially with respect to the jacket and the lock nut forming part of the lock nut assembly.

When a torque imparting tool is turned on the lock nut assembly of the invention, a force is directed against the surface 52 which is forced into the groove-forming wall 42 of the lug nut. As indicated previously, when a torque imparting tool is applied to a conventional lug nut, there is a resultant expansion and thinning of the metal surrounding the lug nut. When the torque imparting force is applied axially against the end of the lock nut, there is also a resultant expansion and thinning of material in the end and particularly, in the tool receiving recess. This resultant expansion and thinning of material actually forces the cap of the jacket into the head of the lock nut itself. As this occurs, there is actually a tightening of the jacket with respect to the lug nut and not a resultant looseness. Consequently, the use of a jacket on the lock nut forming part of the lock nut assembly of the invention actually results in an improved contact between the jacket and the lock nut and does not result in separation which occurs in a lug nut.

This theory of the expansion of the metal and the thinning which causes the intimate contact between the jacket and the lock nut is based largely on theory and has not actually been proven in fact. However, it is believed to be the very reason that the jacket actually becomes firmly secured to the lock nut which has, in fact, resulted.

When comparing the application of torque to a hexagonal lug nut, it can be observed that the torque is applied to the exterior of that lug nut assembly. However, in the case of the present invention, no torque is applied externally of the lug nut assembly, but rather internally within the groove 50.

Since the force on the tool engaging the groove 50 is applied axially, toward the wheel hub, there is no tendency for the jacket to be axially removed from the lock nut. Indeed, the tool which engages the groove 50 actually forces the jacket onto the lock nut, as aforementioned. As a result, there is no need to provide a critical inner diameter and a snug fitting arrangement of the jacket on the lock nut. While a snug fitting relationship between the two components may be desirable, it is not absolutely necessary in the case of the invention.

The left-hand end, that is the tail end 46 of the jacket could be secured to the lock nut in any conventional fashion. The chamfering or bending of the outer end of the jacket, in the manner as illustrated in FIGS. 1-3, is merely one technique which can be used for holding the jacket onto the lock nut, as aforementioned.

FIGS. 9-14 of the drawings illustrate alternate embodiments of the lock nut assemblies of the present invention. FIGS. 9 and 10 illustrate an embodiment $L_2$ including a center 60 which is formed separately and inserted into an initially open end 62 of the nut body 24. This center is preferably stamped separately and press fitted into the opening 62. In this way, the lock nut can be formed with a continuous central bore extending therethrough and with the center inserted so as to enable formation of the groove 38. In the embodiment of FIGS. 9 and 10, the insert or center 60 is cylindrically shaped as best illustrated in FIG. 10. Thus, the torque imparted by a torque imparting tool is applied only to the outer surface of the groove 50.

FIGS. 11 and 12 illustrate an embodiment $L_3$ of the invention and which utilizes a machined center 66 press fitted into an opening 68 in the head end of the nut. In this case, it can be observed that the machined center 66 is provided with a continuous outer head flange 70 thereby forming a somewhat differently sized groove 50. In the manufacture of the embodiment $L_3$, a central bore is formed in the body of the lock nut and the center or insert, in the nature of a stud, is inserted therein as best shown in FIG. 11. The jacket is thereafter fitted upon the lock nut in order to form the assembly. In each case, the jacket is constructed so as to have a groove which is sized and shaped and conforms to the groove of the lock nut. Further, it can be observed that the center and the groove in the cap form and define the particular tool receiving groove.

FIGS. 13 and 14 illustrate an alternate embodiment of a lock nut assembly $L_4$ and which illustrates the fact that the key pattern that is, the pattern of the groove 50 can be changed by incrementally rotating the inner center, such as the center 60 or 66. The same holds true with the lock nut $L_1$ except that the inner center may be integral with the body.

FIG. 15 illustrates a modified form of lock nut $L_5$ which is used essentially only with non-ferris wheels, such as magnesium and aluminum wheels. In this case, the lock nut assembly $L_5$ includes an inner lock nut 72 having an enlarged head 74 and a diametrically reduced shank 76. In this case, a jacket 78 encircles the head 74 and is swaged about the end of the head at 80. The lock nut $L_5$ operates in a manner substantially similar to any of the previously described lock nuts $L_1$ through $L_4$, with the exception that it is provided with the elongate shank end 76.

The present invention also provides a fastener assembly in the form of a locking bolt assembly $L_6$, as best illustrated in FIG. 16 of the drawings. In this case, the locking bolt assemblies $L_6$ comprises an elongate bolt shank 82 having an externally threaded section 84 and an enlarged head 86. A jacket 88 is disposed about the enlarged head 86. Beyond this, the construction of the lock bolt assembly $L_6$ is substantially identical to the construction of the lock bolt assemblies $L_1$. Furthermore, the lock bolt assembly $L_6$ is operable in essentially the same manner as the locking nut assembly $L_1$. However, in this case, the bolt shank 82 is threadedly secured within an internally threaded opening whereas the locking nut assembly was threadedly secured onto an externally threaded stud.

FIGS. 17 and 18 of the drawings illustrate still a further embodiment of a lock nut assembly $L_7$. The lock nut assembly $L_7$ is similar to the lock nut assembly $L_1$ and comprises a lock nut 90 substantially identical to the previously described lock nut 20. Furthermore, the lock nut 90 includes an internally threaded section 92 similar to the internally threaded section 28 of the lock nut assembly $L_1$. Further, a jacket 94 is disposed about the body of the lock nut 90.

The major difference between the lock nut assembly $L_7$ and the previously described lock nut assembly $L_1$ is the fact that the jacket 94 does not provide any inner groove-forming surface as was present in the lock nut assembly $L_1$. Rather, the lock nut 90 is provided with an undulating surface in its top wall 96 and the jacket 94 is provided with an end wall 98 engaging the top wall 96 of the nut. The jacket is similarly provided in its top wall 98 with an undulating groove-forming surface 100. However, unlike the previously described lock nut assemblies, there is no inner groove-forming surface.

In accordance with the construction of the lock nut assembly $L_7$ it can be observed that the torquing action occurs only through the outer groove-forming surface 100. Thus, and in this respect, the operating action of the lock nut assembly $L_7$ is similar to that of the lock nut assembly $L_2$ illustrated in FIGS. 9 and 10.

Thus, there has been illustrated and described a unique and novel lock nut assembly which includes a unique arrangement of a lock fastener with an outer decorative jacket thereon and in which the jacket will not be readily removed from the fastener during the application of a torque imparting tool. This fastener nut assembly therefore fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. A series of locking fastener assemblies for securing a vehicle wheel to a wheel hub through threaded engagement therewith, each said locking fastener assembly of said series comprising:
  a) a tool receiving body having a generally smooth and continuous outer surface contour not readily engagable by tools which could apply a torque to rotate the body;
  b) a threaded section on said body for threaded engagement with a threaded member associated with a vehicle wheel hub;
  c) a head end on said body and having a torque imparting tool receiving opening formed by a somewhat serpentine and undulating tool engagable wall where the tool-receiving opening of several of the locking fastener assemblies of the series have undulating tool-engaging wall configurations which are different from the configuration of the undulating tool engaging walls of each of the other locking fastener assemblies of the series such that, said tool engaging wall configuration provides a security code for this locking fastener assembly with changes in the size or shape, or both, of the surface of the tool-engaging wall presenting a different security code requiring a different torque imparting tool to turn the body; and
  d) a jacket extending around said body and having an outer sleeve engaging an outer surface of said body and a head end, the head end of said jacket being provided with a recess with a somewhat serpentine and undulating wall defining an edge to the recess and having substantially the same size and shape as the somewhat serpentine and undulating wall of the opening in said tool receiving body so as to fit within same, said edge of the recess in the jacket being located to receive an end of a torque imparting tool and to have a rotating force applied thereto if the tool has a tip with a size and shape conforming to the configuration of the undulating tool engaging wall of the head of the tool receiving body and to the configuration of the edge of the recess, said edge of the recess of the jacket also being forced into the opening of the body when a torque applying tool is applied to the assembly, and where the jacket will not be forced off of the body when a force is applied to the assembly.

2. The series of locking fastener assemblies of claim 1 further characterized that said fastener assembly is a lock bolt and the threaded surface is an externally threaded shank sized to extend into a threaded opening.

3. The series of locking fastener assemblies of claim 1 further characterized in that the outer surface of the body is cylindrical and the sleeve of the jacket is cylindrical.

4. The series of locking fastener assemblies of claim 3 further characterized in that the sleeve snugly engages the outer surface of the body.

5. The series of locking fastener assemblies of claim 1 further characterized in that the recess in the jacket is a groove having an outer undulating wall defining the outer edge of the groove in the body and an inner undulating wall defining an inner edge of the groove.

6. The series of locking fastener assemblies of claim 5 further characterized in that said body comprises a center plug inserted into a bore communicating with the tool receiving opening and which center plug partially defines the groove.

7. The series of locking fastener assemblies of claim 6 further characterized in that said center plug is a stamped center which is press fitted into the bore of said body.

8. The series of locking fastener assemblies of claim 6 further characterized in that said center plug is a machined center which is press fitted into the bore of said body.

9. A series of improved lock fastener assemblies with each lock fastener assembly of the series comprised of a body with a generally smooth and continuous outer surface contour portion not readily engaged by tools for turning same, a portion of said body having a threaded section for threaded engagement with a threaded member forming part of a wheel hub, and a torque tool-receiving opening in one end wall of said body and which opening has a somewhat serpentine and undulating outer tool engagable wall and where the configuration of the undulating tool-engaging wall of several of the locking fastener assemblies of the series is different from the configuration of undulating tool engaging walls of each of the other locking fastener assemblies of the series said tool engaging wall configuration providing a security code for each locking fastener assembly with changes in the size or shape, or both, of the surface of the wall presenting a different security code requiring a different torque imparting tool to turn the body; a jacket extending around said body and having an outer sleeve engaging an outer surface of said body and a head end, the head end of said jacket having a groove with an outer groove-forming wall of substantially the same size and shape as the opening in said body so as to fit within same and where an inner groove-forming wall in the jacket and the outer groove-forming wall define the size and shape of the groove, the groove being arranged to receive an end of a tool having a size and shape of the groove so as to fit within the groove and impart a torque when the tool is turned, said groove of the jacket also being forced into the groove of the body when a torque applying tool is applied to the assembly.

10. The series of improved fastener assemblies of claim 9 further characterized in that the outer surface of the body is cylindrical and the sleeve of the jacket is cylindrical and that the sleeve snugly engages the outer surface of the body.

11. The series of improved fastener assemblies of claim 9 further characterized in that the opening in the end wall of the body and the groove at the head end of the jacket are both continuous and undulating.

12. The series of improved fastener assemblies of claim 9 further characterized that said fastener is a lock bolt and the threaded surface is an externally threaded shank sized to extend into a threaded opening.

13. A lock nut assembly for securing a vehicle wheel to a wheel hub having outwardly extending threaded studs thereon, said lock nut assembly comprising:
   a) a nut body having a generally smooth and continuous outer surface contour not readily engagable by tools which could apply a torque to rotate the body;
   b) an interior bore having an internally threaded section for threaded engagement with a threaded stud extending outwardly from a wheel hub;
   c) a head end on said nut body and having a torque imparting tool receiving opening formed by a somewhat serpentine and undulating wall defining a somewhat serpentine and undulating edge to the opening; and
   d) a jacket extending around said nut body and having an outer sleeve engaging an outer surface of said nut body and a head end, the head end of said jacket having a somewhat serpentine and undulating groove of substantially the same size and shape as the opening in said lock nut so as to fit within same, said groove being sized to receive an end of a tool having a size and shape of the groove so as to fit within the groove and impart a torque when the tool is turned, said groove of the jacket also being forced into the groove of the lock nut when a torque applying tool is applied to the assembly, and where the jacket will not be forced off of the nut body when a force is applied to the assembly.

14. The lock nut assembly of claim 13 further characterized in that said nut has a tapered end and said sleeve has an inwardly tapered end to retentively hold the jacket on the nut.

15. The lock nut assembly of claim 14 further characterized in that the sleeve snugly engages the outer surface of the nut body.

16. A lock nut assembly for securing a vehicle wheel to a wheel hub having outwardly extending threaded studs thereon, said lock nut assembly comprising:
   a) a nut body having a generally smooth and continuous outer surface contour not readily engagable by tools which could apply a torque to rotate the body;
   b) an interior bore in said nut body having an internally threaded section for threaded engagement with a threaded stud extending outwardly from a wheel hub;
   c) an opening in an end of said nut body which is somewhat serpentine and undulating;
   d) a jacket extending around said nut body and having an outer sleeve engaging an outer surface of said nut body and a head end; and
   e) a groove in said jacket having an outer groove-forming wall which engages an edge of the opening and an inner groove-forming wall which is somewhat serpentine and undulating, the shapes and contour of the inner groove-forming wall thereby forming and defining a groove to receive a torque imparting tool.

17. The lock nut assembly of claim 16 further characterized in that the outer surface of the nut body is cylindrical and the sleeve of the jacket is cylindrical.

18. The lock nut assembly of claim 16 further characterized in that the edge of the opening in the nut and the groove of the jacket are both continuous and undulating.

19. An improved lock fastener assembly comprised of a lock fastener having a body with a generally smooth and continuous outer surface contour and portion not readily engaged by tools for turning same, a portion of said body having a threaded section for threaded engagement with a threaded member forming part of a wheel hub, a nose portion on said body sized to extend into a stud receiving hole of a vehicle wheel, and an opening in one end wall of said body and which opening has a somewhat serpentine and undulating outer tool engagable wall; the improvement comprising a lubricating film coating on at least the nose portion of said body to prevent galling against a wheel surface, a jacket extending around said body and having an outer sleeve engaging an outer surface of said body and a head end, the head end of said jacket substantially conforming to the one end wall of said body, said head end of the jacket having a groove with an outer groove-forming wall of substantially the same size and shape as the opening in said body so as to fit within same and where an inner groove-forming wall and the outer groove-forming wall define the size and shape of the groove, said sleeve of said jacket extending along the body of the fastener to substantially cover the lubricating film coating on the nose portion or on the body itself and having an outer surface appearance which is intended to be more aesthetically pleasing than the lubricating film coating.

20. The improved fastener assembly of claim 19 further characterized in that the lubricating film coating is a zinc plating and the outer surface of the sleeve is selected from the class consisting of a stainless steel finish or a chrome plating.

21. The improved fastener assembly of claim 19 further characterized in that the groove is arranged to receive an end of a tool having a size and shape of the groove so as to fit within the groove and impart a torque when the tool is turned, said groove of the jacket also being forced into the groove of the body when a torque applying tool is applied to the assembly.

22. The improved fastener assembly of claim 19 further characterized in that the outer surface of the body is cylindrical and the sleeve of the jacket is cylindrical and that the sleeve snugly engages the outer surface of the body.

23. A locking nut assembly for securing a vehicle wheel to a wheel hub through threaded engagement therewith, said locking fastener assembly comprising:
a) a tool receiving body having a generally smooth and continuous outer surface contour not readily engagable by tools which could apply a torque to rotate the body;
b) a threaded section on an internally threaded bore of said body for threaded engagement with and sized to receive a threaded stud associated with a vehicle wheel hub;
c) a head end on said body and having a torque imparting tool receiving opening formed by a somewhat serpentine and undulating tool engagable wall; and
d) a jacket extending around said body and having an outer sleeve engaging an outer surface of said body and a head end, the head end of said jacket being provided with a recess with a somewhat serpentine and undulating wall defining an edge to the recess and having substantially the same size and shape as the somewhat serpentine and undulating wall of the opening in said tool receiving body so as to fit within same, said edge of the recess in the jacket being located to receive an end of a torque imparting tool and to have a rotating force applied thereto if the tool has a tip with a size and shape conforming to the edge of the recess, said edge of the recess of the jacket also being forced into the opening of the body when a torque applying tool is applied to the assembly, and where the jacket will not be forced off of the body when a force is applied to the assembly.

24. The fastener assembly of claim 23 further characterized in that the outer surface of the body is cylindrical and the sleeve of the jacket is cylindrical.

25. The fastener assembly of claim 24 further characterized in that the sleeve snugly engages the outer surface of the body.

26. The fastener assembly of claim 23 further characterized in that the recess in the jacket is a groove having an outer undulating wall defining the outer edge of the groove in the body and an inner undulating wall defining an inner edge of the groove.

27. The fastener assembly of claim 26 further characterized in that said body comprises a center plug inserted into a bore communicating with the tool receiving opening and which center plug partially defines the groove.

28. An improved lock nut assembly comprised of a lock nut having a body with a generally smooth and continuous outer surface contour portion not readily engaged by tools for turning same, a portion of said body having an internal bore with a threaded section therein for threaded engagement with a threaded stud forming part of a wheel hub, and an opening in one end wall of said body and which opening has a somewhat serpentine and undulating outer tool engagable wall; the improvement comprising a jacket extending around said body and having an outer sleeve engaging an outer surface of said body and a head end, the head end of said jacket having a groove with an outer groove-forming wall of substantially the same size and shape as the opening in said body so as to fit within same and where an inner groove-forming wall and the outer groove-forming wall define the size and shape of the groove, the groove being arranged to receive an end of a tool having a size and shape of the groove so as to fit within the groove and impart a torque when the tool is turned, said groove of the jacket also being forced into the groove of the body when a torque applying tool is applied to the assembly.

29. The improved lock nut assembly of claim 28 further characterized in that the outer surface contour of the body is cylindrical and the sleeve of the jacket is cylindrical and that the sleeve snugly engages the outer surface of the body.

* * * * *